United States Patent Office 2,837,518
Patented June 3, 1958

2,837,518

PHENTHIAZINE COMPOUNDS

Robert Michel Jacob, Ablon-sur-Seine, and Jacques Georges Robert, Paris, France, assignors to Societe des Usines Chimiques Rhone-Poulenc, Paris, France, a French body corporate No Drawing. Application October 22, 1956
Serial No. 617,235

Claims priority, application France November 8, 1954

6 Claims. (Cl. 260—243)

This invention relates to new derivatives of phenthiazine and to processes for their production.

It is known that various 10-aminoalkyl phenthiazines possess interesting therapeutic properties. Extensive research and experimentation has shown however that both the size of the therapeutic index and the nature of the therapeutic effect exhibited by certain compounds of this type can radically be changed (even eliminated) by even small changes in chemical structure. Especially is this the case with variations in the nature and length of the side chain attached to the 10-position nitrogen atom and with substitution in the phenthiazine nucleus. Certain of the hitherto known compounds are known to possess activity as potentiators of analgesics, hypnotics or anaesthetics.

It is the object of the present invention to provide certain hitherto unknown phenthiazine derivatives constituting a small group of substances having especially valuable properties in the aforesaid respect.

The aforesaid new phenthiazine derivatives of the invention conform to the general Formula I:

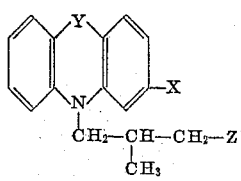

where Y is selected from the class consisting of a sulphur atom and the SO and $SO_2$ groups, X is selected from the class consisting of a hydrogen atom, a methyl, a methoxy, an ethyl and an ethoxy group and Z is selected from the class consisting of the monomethylamino, monoethylamino, dimethylamino, diethylamino, pyrrolidino and piperidino groups, and the invention includes the acid addition salts and quaternary salts thereof formed with non-toxic, therapeutically acceptable acids and salts.

The compounds of the present invention are characterised by a marked activity on the central nervous system by virtue of which they are of general use as potentiators of general anaesthetics and analgesics, antiemetics and neuroleptics. In comparison with known compounds having such activity, they exhibit a more favourable relationship between therapeutic and secondary effects. Furthermore the majority of the new compounds possess a marked antihistaminic activity.

Compounds of the present invention that are of particularly outstanding importance are those in which Z in the foregoing general formula represents a dimethylamino group. Of these compounds those in which Y is a sulphur atom are of the greatest importance i. e. the following five compounds:

3(10-phenthiazinyl)-2-methyl-1-dimethylaminopropane
3(3-methyl-10-phenthiazinyl)-2-methyl-1-dimethylaminopropane
3(3 - ethyl - 10 - phenthiazinyl) - 2 - methyl-1-dimethylaminopropane
3(3 - methoxy - 10 - phenthiazinyl)-2-methyl-1-dimethylaminopropane
3(3-ethoxy-10-phenthiazinyl)-2-methyl-1-dimethylaminopropane These individual compounds (including their acid addition salts and quaternary salts as aforesaid) are not only of greatest importance in relation to their activity on the central nervous system but also on account of their marked antihistaminic activity.

The compounds of the present invention can exist in optically active forms and the invention includes within its scope the racemates as well as the corresponding optically active isomers.

The new compounds of the present invention may be prepared in a variety of different ways, of which the more important can be expressed generically as comprising the interaction of a phenthiazine compound containing a structure represented by the formula:

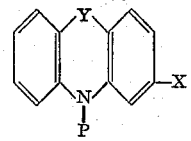

with a compound Q, the group P and the compound Q being such that Q will react with the compound of Formula II to introduce or form at the 10-position of the ring a substituent grouping of the structure:

—A—$Z_1$    III

In Formula II, Y is as hereinbefore defined; in Formula III, A either represents the branched chain

or a group convertible by reduction into said branched chain, such a convertible group being, for example, the group

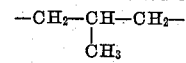

and $Z_1$ represents either the radical Z as hereinbefore defined or a radical convertible into the radical Z, for example by reduction of a CO group present in $Z_1$ to a $CH_2$ group required in Z or by methylation or ethylation of free amino hydrogen atoms present in $Z_1$. Where A is other than said branched chain and/or $Z_1$ is other than Z respectively, the process includes the subsequent step or steps of transforming the convertible group or radical, e. g. by using standard methods of reduction, such as chemical reduction using lithium aluminium hydride or catalytic hydrogenation or by standard methods of methylation or ethylation.

Specific embodiments of the general process defined in the last preceding paragraph are as follows:

(1) Interaction of a phenthiazine compound of the general formula:

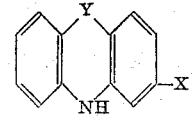

with a halogenoamine of the formula:

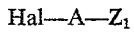

Hal—A—Z₁       V where Hal represents a halogen atom and the other variables are as hereinbefore defined.

This reaction is carried out with or without the use of a solvent and, if desired, in the presence of a condensing agent. It is advantageous to operate in an aromatic hydrocarbon solvent (for example, toluene or xylene) in the presence of a condensing agent, preferably in the form of an alkali metal or derivative thereof (such as, for example, hydride, amide, hydroxide, alcoholate or metal alkyl or aryl) and especially metallic sodium, sodamide, powdered sodium or potassium hydroxide, lithium hydride, sodium tert-butylate, butyllithium or phenyllithium. The reaction is preferably carried out at the boiling temperature of the solvent. It is advantageous to use the halogenoamine in the form of the free base in solution in, for example, benzene, toluene, or xylene, and to add this solution to the mixture of the other reactants in which the phenthiazine may already be present, at least in part, in the form of an alkali metal salt. The reaction may also be carried out using a salt of the halogenoamine but in this case a greater proportion of the condensing agent must clearly be used in order to neutralise the acid of the salt employed.

(2) Condensation of an amine $HZ_1$ with a phenthiazine derivative of the type:

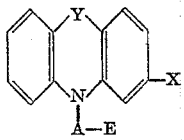

VI where E represents a residue of a reactive ester such as a halogen atom or a sulphuric or sulphonic ester group and the other symbols are as hereinbefore defined.

The reaction may be carried out with or without the use of a solvent and, if desired, in the presence of an alkali metal condensing agent. It is particularly advantageous to use a solvent in the form of an alcohol and an excess of the amine. When the amine is a volatile substance, e. g. dimethylamine, it is advantageous to effect the reaction in an autoclave.

(3) In the case of compounds in which Z represents a methylamino, dimethylamino, ethylamino or diethylamino group, methylation or ethylation by known methods (for example, methylation with formaldehyde and hydrogen in the presence of a catalyst) of the corresponding primary or secondary amines. It is sometimes more advantageous to carry out the alkylation in two stages, by acylation followed by reduction, and these two operations may be carried out simultaneously in certain cases.

(4) Reduction of the corresponding amides:

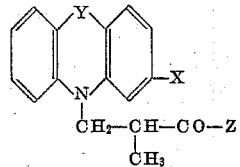

VII and

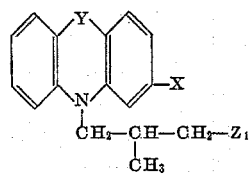

VIII where $Z_1$ contains a CO group which on reduction to a $CH_2$ group converts the grouping to a grouping Z, and the other symbols are as hereinbefore defined, by standard methods, preferably using lithium aluminium hydride in a solvent such as tetrahydrofuran.

(5) Reduction in the presence of an amine HZ of a derivative of the type:

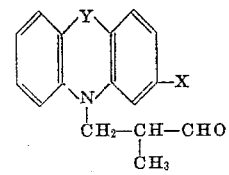

IX (where the symbols are as hereinbefore defined) which may be effected with molecular hydrogen in the presence of a catalyst.

(6) Reduction by standard methods of a nitrile of the general formula:

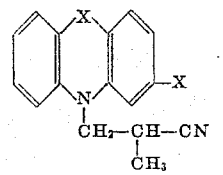

X in the presence of a primary or secondary amine.

Alternative processes for the preparation of the compounds of this invention are:

(7) Cyclisation, preferably in a solvent in the form of a substituted amide of a lower aliphatic acid (such as formamide or acetamide) in the presence of a condensing agent (e. g. alkali metal hydroxide or carbonate) and, if desired, in the presence of a catalyst such as copper powder, of a derivative of the type:

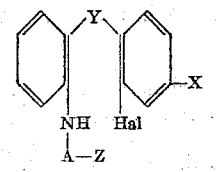

XI (wherein Hal represents a halogen atom).

(8) In the cases where Y represents a sulphur atom, cyclisation with sulphur in the presence of iodine of a diphenylamine of the type:

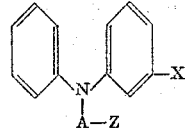

XII (9) In the cases where X represents an SO or $SO_2$ group, oxidation of the corresponding phenthiazine compounds (X=S) of general Formula I. This oxidation may be effected, for example, by means of hydrogen peroxide in the presence of acetic acid or with nitric acid.

When, in the foregoing various methods, one of the groups A, or $Z_1$ represents a convertible group, the process includes the subsequent operation or operations of conversion to the final atoms or groups required.

The optically active isomers may be obtained by resolution of the racemates or by synthesis from optically active starting materials or intermediates.

The following non-limitative examples show how the invention may be put into practice (the melting points are those determined on the Kofler bench).

*Example 1*

95% sodamide (2.77 g.) is added to a solution of phenthiazine (9.6 g.) in xylene (140 cc.) at a temperature of 130° C. and the mixture is heated with reflux for 2 hours.

An 0.61 N solution (90 cc.) of 1-chloro-2-methyl-3-dimethylaminopropane in xylene is then added over 50 minutes and heating with reflux is continued for 20 hours. After cooling, the mixture is treated with water (40 cc.) and N methanesulphonic acid (70 cc.). The aqueous layer is washed with ether, treated with aqueous sodium hydroxide (d.=1.33; 10 cc.) and extracted with ether. The extract is dried over potassium carbonate and evaporated and the residue is distilled in vacuo. 3-(10-phenthiazinyl)-2-methyl-1-dimethylaminopropane (12.6 g.) is collected, distilling between 150° and 175° C. under a pressure of about 0.3 mm. Hg. By dissolving this base in acetone and adding ethereal hydrogen chloride, a hydrochloride is obtained, M. P. 216–217° C.

*Example II*

Proceeding as described in Example I but commencing with phenthiazine (15.7 g.), technical sodamide (4.5 g.) and 1-chloro-2-methyl-3-dimethylaminopropane (15.6 g.), 3-(10 - phenthiazinyl)-2-methyl - 1 - diethylaminopropane (23 g.), B. P. 180–182° C./0.5 mm. Hg, is obtained. On the addition of dry hydrogen chloride to a solution of the last-mentioned base in acetone, a hydrochloride crystallises which, after recrystallisation from a mixture of acetone and isopropanol, melts at 158° C.

1-chloro-2-methyl-3-diethylaminopropane is obtained as the hydrochloride by the action of thionyl chloride on 3-diethylamino-2-methylpropan-1-ol, B. P. 81° C./12 mm. Hg, in boiling benzene solution. The last-mentioned product is prepared by reducing with lithium aluminium hydride methyl 3-diethylamino-2-methylpropionate, itself obtained according to Bieber, C. R. Acad. Sci. Paris 231, 291 (1950).

*Example III*

Proceeding as described in Example II but commencing with phenthiazine (15.7 g.), technical sodamide (4.5 g.) and 1-chloro-2-methyl-3-piperidinopropane (16.7 g.), 3-(10-phenthiazinyl)-2-methyl-1-piperidinopropane (22 g.), B. P. about 215° C./1 mm. Hg, is obtained. On the addition of hydrogen chloride to a solution of the last-mentioned base in acetone, a hydrochloride crystallises, which, after recrystallisation from a mixture of acetone and isopropanol, melts at 186° C.

1-chloro-2-methyl-3-piperidinopropane is obtained as the hydrochloride by the action of thionyl chloride in boiling benzene upon 3-piperidino-2-methyl-propan-1-ol, B. P. 104° C./12 mm. Hg, itself prepared by reducing with lithium aluminium hydride methyl 3-piperidino-2-methylpropionate, B. P. 97–98° C./13 mm. Hg. The last-mentioned product may be obtained by condensing piperidine with methyl methacrylate.

*Example IV*

Proceeding as described in Example II but commencing with phenthiazine (11.5 g.), technical sodamide (3.3 g.) and 1 - chloro-2-methyl-3-1'-pyrrolidinylpropane, 3-(10-phenthiazinyl)-2-methyl-1-1'-pyrrolidinylpropane (18 g.) is obtained. On the addition of oxalic acid to a solution of the last-mentioned base in isopropanol, an acid oxalate crystallises which, after recrystallisation from 50% ethanol, melts at 188° C.

1-chloro-2-methyl-3-1'-pyrrolidinylpropane is obtained as the hydrochloride by the action of thionyl chloride in boiling benzene solution upon 3-1'-pyrrolidinyl-2-methyl-propan-1-ol, B. P. 91° C./15 mm. Hg. The last-mentioned product is obtained by reducing with lithium aluminium hydride methyl 3-1'-pyrrolidinyl - 2 - methylpropionate, B. P. 92–93° C./15 mm. Hg, itself obtained by the condensation of pyrrolidine with methyl methacrylate.

*Example V*

Racemic 3-(10-phenthiazinyl)-2-methyl - 1 - aminopropane (5 g.), M. P. 100–104° C., is agitated in acetic acid (150 cc.) under an atmosphere of hydrogen in the presence of a 30% aqueous solution (10 g.) of formaldehyde and 5% palladised charcoal (1 g.). The theoretical volume of hydrogen is absorbed in 2 hours. The catalyst is filtered off, the filtrate is evaporated to dryness under reduced pressure and the oily residue is treated with aqueous sodium hydroxide and ether. The aqueous layer is separated out and, on evaporation of the ethereal solution, there is obtained the 3-(10-phenthiazinyl)-2-methyl-1-dimethylaminopropane (5.4 g.) already described in Example I. The hydrochloride prepared in acetone melts at 216–218° C. and the base obtained from this hydrochloride melts at 68° C.

The initial primary amine is obtained by hydrogenation under pressure of 3-(10-phenthiazinyl)-2-methylpropionitrile, M. P. 104° C., with Raney nickel in the presence of ammonia. The nitrile is prepared by the action of potassium cyanide in boiling aqueous ethanolic solution upon 10'-phenthiazinylisopropyl toluene-p-sulphonate, M. P. 150–151° C. The last-mentioned product is obtained by the action of toluene-p-sulphonyl chloride upon 1-(10-phenthiazinyl)propan-2-ol in pyridine.

*Example VI*

3-(10-phenthiazinyl) - 2 - methylpropyl toluene-p-sulphonate (3 g.), M. P. 134–135° C., is heated in a sealed tube at 100° C. for 4 hours with dimethylamine (1.5 g.) dissolved in propanol (30 cc.). From the residue obtained by evaporation of the solvent 3-(10-phenthiazinyl)-2-methyl-1-dimethylaminopropane acid maleate, M. P. 187° C., is prepared. The free base obtained from this salt has already been described in Example I and melts at 68° C.

The initial toluene-p-sulphonate is obtained by the action of toluene-p-sulphonyl chloride upon 3-(10-phenthiazinyl)-2-methylpropan-1-ol, M. P. 115° C., in pyridine. This alcohol is obtained by reducing methyl 3-(10-phenthiazinyl)-2-methylpropionate with lithium aluminium hydride. The ester is reduced in the crude oily state as obtained by the action of diazomethane upon the acid, M. P. 148° C., which is itself obtained by the hydrolysis of 3-(10-phenthiazinyl)-2-methylpropionitrile, already described in Example V, with sodium hydroxide in a boiling mixture of methanol and water.

*Example VII*

3-(10-phenthiazinyl)-2-methyl-1-aminopropane (5 g.), M. P. 100° C., $[\alpha]_D^{15} = -6.3°$ (c.=3.7, acetic acid), is agitated in acetic acid (150 cc.) under an atmosphere of hydrogen at normal temperature in the presence of a 30% aqueous solution (10 g.) of formaldehyde and Adams' platinum catalyst (0.25 g.). The theoretical volume of hydrogen is absorbed in 2 hours. The catalyst is filtered off, the filtrate is evaporated to dryness under reduced pressure and the oily residue is treated with aqueous sodium hydroxide and ether. The aqueous layer is separated and, on evaporation of the ethereal solution, an oily residue (4.5 g.) is obtained which is converted in ethyl acetate into an acid maleate, M. P. 170° C., $[\alpha]_D^{17} = +10.7°$ (c.=4.4, methanol). The 3-(10-phenthiazinyl)-2-methyl - 1 - dimethylaminopropane liberated from this maleate is oily and has the optical activity, $[\alpha]_D^{17} = +5.5°$ (c.=3.0, ethanol).

The initial primary amine is obtained by hydrogenation of 3-(10-phenthiazinyl)-2-methylpropionitrile (M. P. 119–120° C. $[\alpha]_D^{13} = -11.2°$ (c.=4.5, tetrahydrofuran)) in tetrahydrofuran with lithium hydride. The nitrile is prepared by the action of potassium cyanide in aqueous ethanol upon optically active 1-(10-phenthiazinyl)prop-2-yl toluene-p-sulphonate obtained from 1-bromopropan-2-ol (Levene and Walti, J. Biol. Chem. 68, 415 (1928)) which is itself prepared from propane-1:2-diol by fermentation (Levene and Walti, Org. Synth. 10, 84 (1930)).

*Example VIII*

Proceeding as described in Example VII but commencing with 3-(10-phenthiazinyl)-2-methyl-1-aminopropane (6 g.), M. P. 100° C., which is dextrorotatory in acetic acid, oily 3-(10-phenthiazinyl)-2-methyl-1-dimenthylaminopropane (2.3 g.) is obtained, which is laevorotatory in ethanol and the acid maleate (2.1 g.) of which melts at 174–175° C. and has the optical activity, $[\alpha]_D^{17} = -12.5°$ (c.=4:0, methanol).

The necessary starting materials are obtained as previously described but commencing with dextrorotatory propane-1:2-diol obtained by the degradation of mannitol according to Baer and Fischer, J. Amer. Chem. Soc. 70, 609 (1948).

Example IX 3-(10-phenthiazinyl)-2-methylpropyl toluene-p-sulphonate (7 g.), monomethylamine (2 g.) and propanol (35 cc.) are heated in a sealed tube at 120° C. for 6 hours. After evaporation of the propanol under reduced pressure, the residue is treated with dilute hydrochloric acid and the acid solutions are washed with ether and then made alkaline with an excess of aqueous sodium hydroxide (d.=1.33). The product which separates is extracted with ether and, on evaporation of the ether, 3-(10-phenthiazinyl)-2-methyl-1-methylaminopropane (4 g.) is obtained as a crude oily base. The corresponding hydrochloride melts at 195–196° C. after recrystallisation from a mixture of acetone (8 vols.) and isopropanol (2 vols.).

3-(10-phenthiazinyl)-2-methylpropyl toluene-p-sulphonate, M. P. 134–135° C., is obtained by the action of toluene-p-sulphonyl chloride upon 3-(10-phenthiazinyl)-2-methylpropan-1-ol, M. P. 115° C., in pyridine. This alcohol is obtained by reducing the methyl ester of 3-(10-phenthiazinyl)-2-methylpropionic acid with lithium aluminium hydride. The acid, M. P. 148° C., may itself be obtained by alkaline hydrolysis of the corresponding nitrile described in Example V.

Example X

Proceeding as described in Example IX but commencing with 3-(10-phenthiazinyl)-2-methylpropyl toluene-p-sulphonate (5 g.) and monoethylamine (6 g.), 3-(10-phenthiazinyl)-2-methyl-1-ethylaminopropane (3 g.) is obtained as a crude oily base. The corresponding hydrochloride melts at 200–201° C. after recrystallisation from isopropanol.

Example XI

3 - (10 - phenthiazinyl) - 2 - methyl - N:N - dimethyl-propionamide (7 g.) dissolved in anhydrous ether (250 cc.) is added slowly to lithium aluminium hydride (0.5 g.) in ether (100 cc.). The mixture is heated under reflux for 3 hours and is then decomposed with water and sodium hydroxide. It is then filtered, the ether is evaporated from the filtrate and the residual oil is taken up in dilute acetic acid. The acid solution is washed with ether and made alkaline with an excess of sodium hydroxide. The product which separates is extracted with ether and, on evaporation of the solvent, 3-(10-phenthiazinyl)-2-methyl-1-dimethylaminopropane (1 g.) is obtained, the hydrochloride of which melts at 217–218° C. after crystallisation from acetone and whose acid maleate melts at 187–188° C. after crystallisation from ethanol.

The amide starting material is the crude product obtained by condensing with dimethylamine the product obtained by the action of thionyl chloride upon 3-(10-phenthiazinyl)-2-methylpropionic acid, M. P. 148° C. already described in Example IX.

Example XII

3 - (10 - phenthiazinyl) - 2 - methyl - 1 - dimethyl-aminopropane (19.35 g.) is dissolved with agitation in glacial acetic acid (120 cc.). Sulphuric acid (d.=1.83; 1.5 cc.) is then added with cooling to 10–15° C. and a mixture of glacial acetic acid (30 cc.) and hydrogen peroxide (6 cc. of a solution containing 38 g. of hydrogen peroxide in 100 cc.) is then run in over 1 hour with agitation, the internal temperature being kept at 15° C. The mixture is left for 16 hours at 20° C. and water (200° C.) is added and, with cooling, sodium hydroxide (d.=1.33; 300 cc.) until a strongly alkaline reaction is obtained. The resulting mixture is shaken with ethyl acetate (3×100 cc.), the ethyl acetate solution is concentrated on a water bath and petroleum ether (100 cc.) is added. 3 - (9 - oxy - 10 - phenthiazinyl) - 2 - methyl-1-dimethylaminopropane (19.7 g.) is obtained, M. P. 98° C.

The corresponding acid maleate, prepared in ethyl acetate and recrystallised from a mixture of ethanol and ether, melts at 160° C.

Example XIII

3 - (10 - phenthiazinyl) - 2 - methyl - 1 - dimethyl-aminopropane (11.9 g.) is dissolved with agitation in glacial acetic acid (120 cc.). Pure sulphuric acid (d.=1.83; 0.5 cc.) is added and a mixture of glacial acetic acid (10 cc.) and hydrogen peroxide (8.5 cc. of a solution containing 38 g. of hydrogen peroxide in 100 cc.) is then run in over 20 minutes. The temperature rises from 25–35° C. and is then kept at 60° C. for 18 hours. The mixture is cooled and water (150 cc.) is added and, with cooling, aqueous sodium hydroxide (d.=1.33; 220 cc.). The resulting mixture is extracted with ethyl acetate (3×100 cc.), the solvent is evaporated on a water bath and the residue is recrystallised from heptane (150 cc.). 3 - (9:9 - dioxy - 10 - phenthiazinyl) - 2 - methyl - 1 - dimethylaminopropane (7.8 g.) is obtained, M. P. 115° C.

The corresponding hydrochloride prepared in ethyl acetate and recrystallised from a mixture of ethanol and isopropanol melts at 250° C.

Example XIV

3 - (10 - phenthiazinyl) - 2 - methyl - 1 - dimethylamino-propane (5.96 g.) and ethyl iodide (2.5 cc.) are dissolved in acetone (5 cc.). The mixture is left to stand for 24 hours at room temperature and, on seeding, the mass crystallises. The product is filtered off, washed with acetone and ether and dried in vacuo over sulphuric acid. [3 - (10 - phenthiazinyl) - 2 - methylpropyl] - dimethyl-ethylammonium iodide (7.9 g.) is thus obtained, M. P. 180–190° C. (not sharp).

Example XV

Racemic 3-(10-phenthiazinyl) - 2 - methylproprionitrile (5.3 g.), M. P. 104° C., is dissolved in methanol (300 cc.) and dimethylamine (10 g.) and a 10% palladium on barium sulphate catalyst (15 g.) are added. The mixture is agitated under a hydrogen pressure of 2–3 kg./cm.² until absorption of hydrogen is complete. The catalyst is filtered off, the methanol is evaporated and the residue is treated with ether. The ethereal solution is extracted with dilute hydrochloric acid, the aqueous layer is made alkaline with sodium hydroxide and the oil which separates is extracted with ether. On evaporation of the ether, there is obtained 3-(10-phenthiazinyl)-2-methyl - 1 - dimethylaminopropane, the hydrochloride of which melts at 216–218° C.

Example XVI

95% sodamide (2.33 g.) is added to a boiling solution of 3-ethylphenthiazine (11.35 g.) M. P. 135–136° C., in anhydrous xylene (150 cc.) and the mixture is heated with agitation under reflux for 1½ hours. A solution of 1-dimethylamino-2-methyl-3-chloropropane (7.72 g.) in anhydrous xylene (90 cc.) is then run in over a period of 45 minutes while the reaction temperature is maintained and heating under reflux is continued for 18 hours.

After cooling, the reaction mixture is agitated with a mixture of water (40 cc.) and a normal solution of methanesulphonic acid (70 cc.), the xylene layer is removed and the acid liquors are washed with ether (200 cc.). The aqueous phase is then made alkaline with sodium hydroxide (d.=1.33; 10 cc.) and the liberated base is extracted with ether. The ethereal solution is dried over anhydrous potassium carbonate and concentrated at normal pressure. On distillation of the residue under reduced pressure 3-(3-ethyl-10-phenthiazinyl)-2- methyl-1-dimethylaminopropane (14.5 g.), B. P. 160–182° C./0.45 mm. Hg, is obtained.

The base is dissolved in acetone (60 cc.) and the solution is treated with a 1.7 N ethereal solution (24.5 cc.) of hydrochloric acid. The precipitate is filtered off, washed with acetone and dried to give the hydrochloride (10.2 g.), M. P. 160–163° C.

The 1-dimethylamino-2-methyl-3-chloropropane used as starting material is obtained as the hydrochloride, M. P. 172° C., by the action of thionyl chloride (61 g.) on a solution of 3-dimethylamino-2-methylpropanol (40 g.) in a 96% yield.

The 3-dimethylamino-2-methylpropanol may be obtained by the reduction of 3-dimethylamino-2-methylpropionaldehyde according to Mannich, Lesser and Silten, Ber. 65, 382 (1932).

*Example XVII*

Proceeding as in Example XVI, but using 3-methylphenthiazine (20.6 g.), M. P. 188° C., and 1-dimethylamino-2-methyl-3-chloropropane (15.15 g.), 3-(3-methyl-10-phenthiazinyl) - 2 - methyl - 1 - dimethylaminopropane (25.8 g.) is obtained, M. P. 75° C., B. P. 165–174° C./0.1 mm. Hg. The hydrochloride prepared in acetone melts at 173–175° C.

*Example XVIII*

Proceeding as in Example XVI, but using 3-methoxyphenthiazine (12 g.), M. P. 180–182° C., and 1-dimethylamino-2-methyl-3-chloropropane (8.2 g.), 3-(3-methoxy-10-phenthiazinyl) - 2 - methyl - 1 - dimethylaminopropane (11.3 g.) is obtained, M. P. 103° C., boiling point 182–191° C./0.15 mm. Hg. The hydrochloride prepared in isopropanol melts at about 90° C.

*Example XIX*

Sodamide (2.4 g.) is added to a solution of 3-ethoxyphenthiazine (12.2 g.) in xylene (150 cc.) and the mixture is heated under reflux for 2 hours. A solution of 1-dimethylamino-2-methyl-3-chloropropane (7.2 g.) in xylene (90 cc.) is then added over 45 minutes and the mixture is heated under reflux for 20 hours. The mixture is then treated with dilute sulphuric acid, the xylene is decanted and the equous acid layer is washed with ether. The aqueous solution is then made alkaline and extracted with ether. The ethereal solution is concentrated by evaporating the solvent and the residue is distilled under reduced pressure to give 3-(3-ethoxy-10-phenthiazinyl)-2-methyl-1-dimethylaminopropane (10.6 g.), B. P. 175–186° C./0.2 mm. Hg. The corresponding acid maleate melts at 110° C.

The 3-ethoxyphenthiazine, M. P. 140–141° C., used as starting material is obtained from 3-ethoxydiphenylamine, M. P. 64–66° C., by cyclisation with sulphur at 150–180° C.

*Example XX*

Sodamide (1.85 g.) is added to a solution of 3-methoxyphenthiazine (9 g.) in anhydrous xylene (50 cc.) at 100° C. and the mixture is heated for 1½ hours under reflux. A solution of 3-chloro-2-methyl-1-pyrrolidinopropane (6.3 g.), in xylene (90 cc.) is then run in over 10 minutes and heating is continued for 22 hours. After cooling, the mixture is acidified with a dilute solution of methane sulphonic acid, the xylene phase is separated and the aqueous phase is washed with ether. The aqueous solution is finally made alkaline and the base which precipitates is extracted with ether. The ethereal solution is dried over potassium carbonate and evaporated to dryness and the residue is distilled in vacuo. There is thus obtained 3-(3-methoxy-10-phenthiazinyl)-2-methyl-1-pyrrolidinopropane (10.9 g.), B. P. 177–190° C./0.4 mm. Hg, colourless crystals, M. P. 98° C. after recrystallisation from ethanol.

The corresponding hydrochloride M. P. 182° C. is prepared by treating a solution of the base in acetone with ethereal hydrogen chloride.

*Example XXI*

3 - (3 - methoxy - 10 - phenthiazinyl) - 2 - methylpropyl toluene-p-sulphonate (6.5 g.) is heated in ethanol (30 cc.) with dimethylamine (3.2 g.) for 16 hours at 100° C. in an autoclave. The residue obtained on evaporation of the ethanol is treated with water and extracted with ether and the aqueous solution is made alkaline. A base separates which is extracted with ether. On evaporation of the ether there is obtained crude 3-(3-methoxy-10-phenthiazinyl)-2-methyl-1-dimethylaminopropane (4 g.) which, after purification by recrystallisation from aqueous acetone, is identical with the product described in Example XVIII.

The initial toluene-p-sulphonate, M. P. 111° C., is obtained by the action of toluene-p-sulphonyl chloride in pyridine upon 3-(3-methoxy-10-phenthiazinyl)-2-methyl-1-propanol, B. P. 175–181° C./1 mm. Hg, prepared by reducing with lithium aluminium hydride crude methyl 3-(3-methoxy-10-phenthiazinyl)-2-propionate, itself obtained by the action of diazomethane upon 3-(3-methoxy-10-phenthiazinyl)-2-methylpropionic acid. This acid, M. P. 131° C., is obtained by the action of sodium hydroxide in boiling methanol upon the racemic nitrile corresponding to that described in the following example.

*Example XXII*

Optically active 3 -(3 - methoxy - 10 - phenthiazinyl)-2-methyl-1-aminopropane hydrochloride (8.4 g.) is dissolved in methanol (150 cc.) with a 33% aqueous solution (45 g.) of formaldehyde. Adams' platinum catalyst (0.5 g.) is added and hydrogenation is carried out at room temperature and at atmospheric pressure. When the absorption of hydrogen is complete, the catalyst is filtered off, the methanol is evaporated under reduced pressure and the residue is treated with dilute sodium hydroxide and chloroform. The chloroform solution is washed with water and dried over potassium carbonate. On evaporation of the solvent, there is obtained crude 3-(3-methoxy-10-phenthiazinyl)-2-methyl-1-dimethylaminopropane (7.5 g.) which, after recrystallisation from heptane or acetone, melts at 116–118° C., and has the optical activity $[\alpha]_D^{20} = -12°$ (c.=5%, CHCl$_3$).

The initial primary amine, the hydrochloride of which at 234–236° C., is obtained by reducing 3-(3-methoxy-10-phenthiazinyl)-2-methylpropionitrile, M. P. 110–112° C., with lithium aluminium hydride in tetrahydrofuran. The nitrile is prepared by the action of potassium cyanide in aqueous alcoholic solution upon 1-(3-methoxy-10-phenthiazinyl)-2-propyl toluene-p-sulphonate, M. P. 96–100° C., itself prepared by the action of toluene-p-sulphonyl chloride upon oily 1-(3-methoxy-10-phenthiazinyl) isopropanol in anhydrous pyridine. The phenthiazinyl isopropanol is obtained by the condensation of the L propylene oxide described in the literature with the lithium derivative of 3-methoxyphenthiazine in tetrahydrofuran. The L propylene oxide used is obtained through the bromo-ester from L propyleneglycol prepared according to Baer and Fischer, J. Am. Chem. Soc. 70, 609 (1948).

*Example XXIII*

Optically active 3-(3-ethyl-10-phenthiazinyl)-2-methyl-1-aminopropane (8.9 g.) is dissolved in N hydrochloric acid (28.3 cc.) and a 33% aqueous solution (55 cc.) of formaldehyde in methanol (190 cc.), Adams' platinum catalyst (0.5 g.) is added and the mixture is agitated at room temperature and under a slight pressure of hydrogen. When the absorption is complete, the catalyst is filtered off, the methanol is evaporated on the water bath and the aqueous residue is treated with excess sodium hydroxide (d.=1.33) and extracted with ether.

On evaporation of the ether, there remains optically active 3 - (3 - ethyl - 10 - phenthiazinyl) - 2 - methyl - 1 - dimethylaminopropane (9 g.), the maleate of which, crystallised from ethyl acetate, melts at 136° C., and has the optical activity $[\alpha]_D^{20} = -11.5°$ (c.=4%, methanol).

The initial primary amine is obtained as an oil by reduction with lithium aluminium hydride in tetrahydrofuran of optically active 3-(3-ethyl-10-phenthiazinyl)-2-methylpropionitrile. The latter is obtained as an oil by the action of potassium cyanide in aqueous ethanol on 1-(3-ethyl-10-phenthiazinyl)-2-propyl toluene-p-sulphonate, M. P. 82° C. This ester is obtained by the action of toluene-p-sulphonyl chloride upon oily 1-(3-ethyl-10-phenthiazinyl)-2-propanol in anhydrous pyridine. This phenthiazinyl alcohol is obtained by condensation of L propyleneoxide with the lithium derivative of 3-ethylphenthiazine in anhydrous ether.

*Example XXIV*

3 - (3 - methoxy - 10 - phenthiazinyl) - 2 - methyl - 1 - methylaminopropane (4.8 g.) is dissolved in methanol (75 cc.) and N hydrochloric acid (15 cc.), a 30% aqueous solution (15 cc.) of formaldehyde and Adams' platinum catalyst (0.2 g.) are added. The mixture is agitated under a slight pressure of hydrogen until absorption is complete, the catalyst is filtered off and the solvent is evaporated. The residue is treated with water and, on addition of sodium hydroxide, a base precipitates which is extracted with ether and dried over potassium carbonate. On evaporation of the ether, there is obtained crude 3 - (3 - methoxy - 10 - phenthiazinyl) - 2 - methyl-1 - dimethylaminopropane (3.5 g.) which, after purification by recrystallisation from aqueous acetone, is identical with the product described in Example XVIII.

The initial secondary base, whose picrate melts at 210–212° C., is obtained by the hydrolysis of the formyl derivative, described in the next example, with aqueous sodium hydroxide in ethanol.

*Example XXV*

A solution of 3 - (3 - methoxy - 10 - phenthiazinyl)-2 - methyl - 1 - methylformamidopropane (6.8 g.) in tetrahydrofuran (40 cc.) is run into a suspension of lithium aluminium hydride (1.14 g.) in tetrahydrofuran (60 cc.). After three hours agitation, water and sodium hydroxide are added, the solid is filtered off and the cake is washed with tetrahydrofuran. On evaporation of the solvent, a crude base (3.5 g.) remains which, after purification by recrystallisation from a mixture of acetone and water, is identical with the 3-(3-methoxy-10-phenthiazinyl) - 2 - methyl - 1 - dimethylaminopropane described in Example XVIII.

The 3 - (3 - methoxy - 10 - phenthiazinyl) - 2 - methyl-formamidopropane starting material is obtained as a crude oil by condensing in boiling xylene the sodium derivative of 3-methoxyphenthiazine (obtained with sodamide) with 1-methylformamido-2-methyl-3-chloropropane, B. P. 138° C./26 mm. Hg. The last-mentioned product is prepared by the action of thionyl chloride in chloroform in the presence of pyridine upon 1-methylformamido-2-methyl-3-propanol, B. P.=126–127° C./2 mm. Hg. This propanol is obtained by heating in formamide 3-methylamino-2-methyl-1-propanol, B. P.=91° C./26 mm. Hg itself obtained by the reduction of methyl 3-methylamino-2-methylpropionate, B. P. 73–75° C./30 mm. Hg, with lithium aluminium hydride. The ester is readily obtained by the condensation of monomethylamine with methyl methacrylate.

*Example XXVI*

Proceeding as in the preceding example but using as starting material an optically active methyl 3-methylamino-2-methylpropionate there are obtained through the same intermediates but in their optically active forms; from the dextorotatory ester, the laevorotatory 3-(3-methoxy - 10 - phenthiazinyl) - 2 - methyl - 1 - dimethyl-aminopropane described in Example XXII; and from the laevorotatory ester, dextrorotatory 3 - (3 - methoxy-10 - phenthiazinyl) - 2 - methyl - 1 - dimethylaminopropane, the optical antipode of the former.

The optically active methyl 3-methylamino-2-methylpropionates are obtained by crystallising the camphosulphonic acid (Reychler's acid) salts from a mixture of ethyl acetate and ether. The dextrorotatory product is recrystallised as the dibenzoyltartrate from ethanol.

*Example XXVII*

3 - (3 - methoxy - 10 - phenthiazinyl) - 2 - methyl-N:N - dimethylpropionamide (2 g.) dissolved in ether (25 cc.) is run into a suspension of lithium aluminium hydride (0.15 g.) in ether (20 cc.). The mixture is heated for 3 hours under reflux and the complex is then decomposed by the addition of a small quantity of water. On filtration and evaporation of the ether, a crude oily product (2 g.) is obtained which, after recrystallisation from aqueous acetone, is identical with the 3-(3-methoxy-10 - phenthiazinyl) - 2 - methyl - 1 - dimethylaminopropane described in Example XVIII.

The amide starting material is obtained by the action of dimethylamine in ethanol in an autoclave at 120° C. on the crude methyl 3 - (3 - methoxy - 10 - phenthiazinyl)-2-methylpropionate described in Example XXI.

*Example XXVIII*

Racemic 3 - (3 - methoxy - 10 - phenthiazinyl) - 2-methylpropionitrile (5.9 g.), M. P. about 118–120° C., is dissolved in methanol (300 cc.) and dimethylamine (10 g.) and a 10% palladium on barium sulphate catalyst (15 g.) are added. The mixture is agitated with hydrogen under a pressure of 2–3 kg./cm.² until absorption is complete. The catalyst is then filtered off, the methanol is evaporated and the residue is treated with ether. The ethereal solution is extracted with dilute hydrochloric acid, and on making alkaline with sodium hydroxide, the aqueous solution precipitates an oil which is extracted with ether and is the 3-(3-methoxy-10-phenthiazinyl)-2-methyl-1-dimethylaminopropane already described in Example XVIII.

*Example XXIX*

An acetic acid solution of 3-(3-methoxy-10-phenthiazinyl) - 2 - methyl - 1 - dimethylaminopropane (6.6 g.) is oxidised for 17 hours at 60° C. with 130 vol. hydrogen peroxide (4.3 cc.) in the presence of sulphuric acid (d.=1.83; 0.25 cc.). The crude base is separated by diluting with water, making alkaline and extracting with ethyl acetate. It is purified through its acid fumarate and there is thus obtained 3-(3-methoxy-9:9-dioxy-10-phenthiazinyl)-2-methyl-1-dimethylaminopropane, M. P. about 110° C.

*Example XXX*

A solution of 3-(3-methoxy-10-phenthiazinyl)-2-methyl-1-dimethylaminopropane (32.8 g.) in ethyl acetate (375 cc.) is heated for 2 hours under reflux with benzyl bromide (26.6 g.). The crude product which precipitates from the reaction mixture is crystallised from a mixture of chloroform and ether and there is thus obtained [3-(3-methoxy-10-phenthiazinyl)-2-methyl-propyl]-benzyldimethylammonium bromide, M. P. about 160° C. On degradation by heating in ethanol this quaternary ammonium derivative gives the starting material.

*Example XXXI*

Racemic 3-(3-methoxy-10-phenthiazinyl)-2-methyl-1-dimethylaminopropane (3.28 g.), the corresponding hydrochloride (3.65 g.) and l-tartaric acid (1.5 g.) are dissolved in boiling isopropanol (50 cc.). The mixture is left to cool to 60° C. and is then seeded and agitated for some hours at this temperature. The solid is then filtered off while maintaining the temperature at 60° C. and the crystals are washed with hot isopropanol and dried in vacuo. There is thus obtained laevorotatory 3-

(3 - methoxy - 10 - phenthiazinyl) - 2 - methyl - 1 - dimethylaminopropane l-tartrate (2.1 g.). The base liberated from this salt with alkali melts at 124° C. after recrystallisation from ethanol and has the optical activity $[\alpha]_D^{20} = -15.3°$ (c.=5.2%, CHCl$_3$).

*Example XXXII*

Proceeding as in Example XXXI but commencing with racemic 3-(3-methoxy-10-phenthiazinyl)-2-methyl-1-dimethylaminopropane (100 g.), the corresponding hydrochloride (111 g.), d-tartaric acid (45.7 g.) and isopropanol (3,000 cc.) there is obtained dextrorotatory 3-(3-methoxy-10 - phenthiazinyl) - 2 - methyl - 1 - dimethylaminopropane d-tartrate (76 g.) the optical antipode of the product described in Example XXXI.

The mother liquors from the crystallisation are concentrated to 300 cc. and 2.6 N alcoholic potash (112 cc.) are added. The mixture is then cooled slowly to 0° C. and is seeded with the laevorotatory 3-(3-methoxy-10-phenthiazinyl)-2-methyl-1-dimethylaminopropane base. The mixture of mineral salts and the base which precipitates are filtered off and treated with water and ether. On decantation and evaporation of the ethereal solution there is obtained the laevorotatory 3-(3-methoxy-10-phenthiazinyl)-2-methyl-1-dimethylaminopropane base (40 g.) already described in Example XXXI.

As already stated the compounds of the invention are of exceptional value as potentiators of analgesics, hypnotics and anaesthetics. The compounds are preferably employed for such purposes in the form of their acid addition salts containing pharmaceutically acceptable anions (such as hydrochlorides and other hydrohalides and 8-chlorotheophyllinates) or of quaternary ammonium salts obtained by reaction with organic halides (e. g. methyl iodide) or other reactive esters. Numerous examples of such acid addition salts and of quaternary salts are given in the foregoing examples.

The present application is a continuation-in-part of applications Serial No. 545,103, filed November 4, 1955, and Serial No. 549,174, filed November 25, 1955, both of which applications are abandoned.

We claim:
1. 3(10 - phenthiazinyl) - 2 - methyl - 1 - dimethylpropane.
2. 3(3 - methyl - 10 - phenthiazinyl) - 2 - methyl - 1-dimethylaminopropane.
3. 3(3 - ethyl - 10 - phenthiazinyl) - 2 - methyl - 1-dimethylaminopropane.
4. 3(3 - methoxy - 10 - phenthiazinyl) - 2 - methyl-1-dimethylaminopropane.
5. 3(3 - ethoxy - 10 - phenthiazinyl) - 2 - methyl - 1-dimethylaminopropane.
6. A member of the class consisting of the racemic and optically active phenthiazine derivatives of the general planar formula:

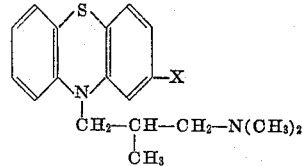

and their therapeutically acceptable salts wherein X is selected from the class consisting of the hydrogen atom, methyl, methoxy, ethyl and ethoxy groups.

References Cited in the file of this patent
UNITED STATES PATENTS

| | | |
|---|---|---|
| 2,483,998 | Hunter et al. | Oct. 4, 1949 |
| 2,512,520 | Cusic | June 20, 1950 |
| 2,519,886 | Charpentier | Aug. 22, 1950 |
| 2,526,118 | Charpentier | Oct. 17, 1950 |
| 2,530,451 | Charpentier | Nov. 21, 1950 |
| 2,645,640 | Charpentier | July 14, 1953 |

FOREIGN PATENTS

| | | |
|---|---|---|
| 47,552 | India | Dec. 16, 1952 |

OTHER REFERENCES

Viaud: J. Pharm. and Pharmacol., vol. 6 (1954), pages 361 and 364.